Patented Mar. 4, 1952

2,587,936

UNITED STATES PATENT OFFICE 2,587,936

IODINATED 2-ACYLAMINO BENZOYL DERIVATIVES OF AMINO ACIDS

Vernon H. Wallingford, Ferguson, Mo., assignor to Mallinckrodt Chemical Works, St. Louis, Mo., a corporation of Missouri No Drawing. Application May 23, 1949, Serial No. 94,929

9 Claims. (Cl. 260—518)

This invention relates to iodinated acylaminobenzoyl derivatives of amino acids.

Briefly the invention comprises methods of making compounds having the formula:

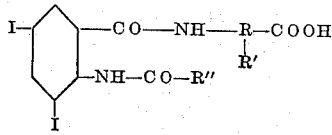

where R is a methylene or lower polymethylene radical, R' is a phenyl, carboxy lower alkyl, hydroxy lower alkyl hydroxyphenyl or iodo substituted phenyl radical, or hydrogen, and R'' is an alkyl, phenyl or nuclear iodine containing derivative of a phenyl radical, by reacting iodinated anhydro derivatives of 2-acylamino-3,5-diiodobenzoic acids with amino acids. The present invention also includes new compounds of the type described above, and methods of forming acylamino-benzoyl derivatives of amino acids by the reaction of anhydro derivatives of acylaminobenzoic acids and an amino acid.

Among the objects of this invention are the provision of new compounds which are derivatives of benzoic acid and which contain a plurality of iodine atoms; the provision of compounds of the type indicated which are useful intermediates for the preparation of other compounds of related structure; the provision of compounds of the type referred to which possess relatively low toxicity toward human bodies; the provision of compounds of the type referred to which possess substantial solubility in water; the provision of improved contrast media for X-ray diagnosis; the provision of compounds which are relatively stable under normal conditions of storage and use and in the presence of body fluids; and, the provision of methods for preparing compounds of the type referred to. Other features will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

Benzoic acid derivatives of the type:

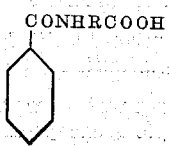

have been prepared by reacting an acid chloride with an amino acid in the presence of an alkali. In my copending application Serial No. 67,570 I have shown how this reaction can be used in preparing polyiodinated aminobenzoyl derivatives of the amino acids. However, when one attempts to use this reaction to prepare acylaminobenzoyl derivatives, the desired compounds are either not obtained at all or in such small yields and so admixed with by-products that their recovery and purification is not feasible. No known reactions prior to the present invention are suitable for preparing the acylaminobenzoyl derivatives of amino acids.

Simple and convenient methods for preparing these compounds have been found in accordance with the present invention. The desired amino acid derivatives are obtained in good yields by reacting the anhydro derivatives of 2-acylamino-3,5-diiodobenzoic acid with amino acids to give iodinated N-acylaminobenzoyl-amino acids as follows:

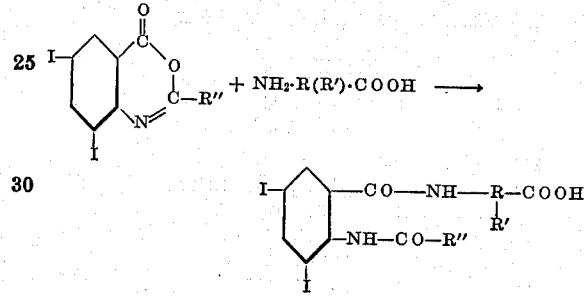

in which R is a methylene or lower polymethylene radical, R' is a phenyl, carboxy lower alkyl, hydroxy lower alkyl hydroxyphenol or iodo substituted phenyl radical, or hydrogen, and R'' is an alkyl or phenyl radical or a nuclear-iodine containing derivative of a phenyl radical.

The anhydro derivatives of 2-acylamino-3,5-diiodobenzoic acids are described in my above mentioned copending application, wherein preparation of these compounds from readily available materials is disclosed.

These novel iodinated acylaminobenzoyl derivatives of amino acids have valuable properties which make them useful for many purposes. They are, for example, opaque to X-rays, and can therefore be used as contrast agents for X-ray diagnosis.

The following examples illustrate the invention:

EXAMPLE 1

*2-acetylamino-3,5-diiodohippuric acid*

Anhydro-2-acetylamino-3,5-diodobenzoic acid (10.3 g.) was stirred for six hours at room temperature with aminoacetic acid (3.7 g.) in the presence of water (20 ml.), dioxane (20 ml.) and sodium hydroxide (4 ml. of 35° Bé. solution; equivalent to 1.5 g. of NaOH). During this time, practically all of the solid dissolved. The resulting solution was diluted with water (150 ml.), filtered and then diluted again to a volume of one liter. On adding dilute nitric acid, a solid precipitated. It was coagulated by heating the mixture for one hour at about 75° C. The mixture was filtered and the solid 2-acetylamino-3,5-diiodohippuric acid was washed and dried at 110° C. It weighed 11.5 g. (94.6% of theory based on the anhydro compound) and melted at 249–252° C. with decomposition after first darkening at 240° C. Found on analysis: 26.95% and 26.97% carbon; 2.08% and 2.16% hydrogen. Calculated for $C_{11}H_{10}O_4N_2I_2$: 27.1% carbon, 2.05% hydrogen. Neutralization equivalent 470 (phenolphthalein), 488 (methyl red). Theory: 487.8.

The identity of the compound was further confirmed by the fact that its melting point was depressed by admixture with either 2-amino-3,5-diiodobenzoic acid or 2-acetylamino-3,5-diiodobenzoic acid. Both of these compounds might theoretically have been formed by the reaction. The high yield is another indication that condensation with the aminoacetic acid actually took place.

EXAMPLE 2

*Sodium salt of 2-acetylamino-3,5-diiodohippuric acid*

A suspension of purified 2-acetylamino-3,5-diiodohippuric acid (12.2 g.) in water (50 ml.) was made slightly alkaline with sodium hydroxide and warmed. The sodium salt was recovered as white, shiny leaflets by evaporating the solution under reduced pressure and drying the residue in a desiccator over calcium chloride. One gram of the salt dissolved completely in 15.5 ml. of water at 25° C.

EXAMPLE 3

*Diethanolamine salt of 2-acetylamino-3,5-diiodohippuric acid*

Purified 2-acetylamino-3,5-diiodohippuric acid (11.1 g.) was made slightly alkaline with diethanolamine and diluted to a total volume of 40.4 ml. The resulting solution of the diethanolamine salt had an amber color that remained unchanged when the solution was sterilized at 15 lbs. steam pressure for fifteen minutes.

EXAMPLE 4

*N-(2-acetylamino-3,5-diiodobenzoyl)-ω-aminocaproic acid*

ω-Aminocaproic acid (6.6 g., 0.05 mole) was stirred with anhydro-2-acetylamino-3,5-diiodobenzoic acid (10.3 g., 0.025 mole) in water (20 ml.), dioxane (20 ml.) and sodium hydroxide (4 ml. of 35° Bé. solution, equivalent to 1.5 g. of NaOH). A large part of the solid dissolved initially, as the temperature rose to 37° C., but within thirty minutes a solid separated as a thick slurry. Stirring was continued overnight, and on the following morning more water (150 ml.) was added and the solid was dissolved by warming the mixture to 60° C. The solution was made just acid to phenolphthalein with hydrochloric acid, treated with decolorizing carbon, and filtered. The filtrate was dark. It was diluted to 300 ml. with water and warmed to 60° C. Dilute hydrochloric acid (75 ml.; one volume of concentrated hydrochloric acid to 30 volumes of water) was then added slowly with stirring. The resulting gray-white N-(2-acetylamino-3,5-diiodobenzoyl)-ω-aminocaproic acid precipitate was filtered from the hot solution, washed, and dried to constant weight (10.5 g.) in a vacuum desiccator. It melted at 191.7–195° C. A second crop weighing 0.5 g. was obtained by cooling the mother liquor in a refrigerator. It melted at 178–181.5° C. The total yield (11 g.) was 81% of theory.

A portion of the material (5.5 g.) from the first crop was recrystallized from 50% (by volume) ethyl alcohol (350 ml.) without prior treatment with decolorizing carbon. The crystals were filtered off, washed with two 10 ml. portions of 50% (by volume) alcohol, and dried to constant weight in a vacuum desiccator. Recovery was 76%. A second crop of 0.15 g. was obtained by cooling the mother liquor in a refrigerator.

A second recrystallization from 50% (by volume) ethyl alcohol (300 ml.), again without treatment with decolorizing carbon, gave a 93% recovery of a gleaming white solid. The alcoholic solution was first allowed to crystallize at room temperature and finally in a refrigerator. After it was dried to constant weight at 70° C., the purified N-(2-acetylamino-3,5-diiodobenzoyl)-ω-aminocaproic acid melted at 201.2–202.7° C. Found on analysis: 33.37% and 32.98% carbon; 3.08% and 3.16% hydrogen. Calculated for $C_{15}H_{18}O_4N_2I_2$: 33.09% carbon; 3.33% hydrogen.

EXAMPLE 5

*N-(2-acetylamino-3,5-diiodobenzoyl)-glutamic acid*

Glutamic acid (7.4 g., 0.05 mole) was stirred with anhydro-2-acetylamino-3,5-diiodobenzoic acid (10.3 g., 0.025 mole) in water (16 ml.), dioxane (20 ml.) and sodium hydroxide (8 ml. of 35° Bé. solution; equivalent to 3.0 g. NaOH). The temperature rose to 38° C. After the mixture had been stirred for three hours, the greater part of the solid was still undissolved. Therefore, the temperature was raised to 45–50° C. and stirring was continued for an additional three hours. The resulting solution was then diluted to 300 ml., filtered, and incompletely precipitated with dilute hydrochloric acid (one volume of concentrated hydrochloric acid to thirty volumes of water). The precipitate was filtered off and washed. The filtrate was completely precipitated by making it acid to Congo red with concentrated hydrochloric acid. Both crops were dried to constant weight in a vacuum desiccator. The first crop weighed 7.8 g. and melted at 225.4° C. with decomposition. The second crop, a yellowish white solid, weighed 3.6 g. and melted at 198.5° C. with decomposition. A mixture of the two crops decomposed at 211.8–212.5° C., indicating that they consisted essentially of the same substance, N-(2-acetyl-amino-3,5-diiodobenzoyl)-glutamic acid, the second crop being less pure than the first. The combined crops weighed 11.4 g. (82% of theory). Found on analysis (first crop): 29.59% and 29.67% carbon; 2.56% and 2.43% hydrogen. Calculated for $C_{14}H_{14}O_6N_2I_2$: 30.00% carbon; 2.52% hydrogen. Neutralization equivalent found: 545. Calculated: 556.

EXAMPLE 6

*N-(2-acetylamino-3,5-diiodobenzoyl)-glutamic acid*

The following preparation was similar to that described in Example 5, except that five times the molar quantities were used. The temperature of the mixture rose initially to 46° C., then slowly dropped back to room temperature. After the mixture had been stirred at room temperature for 19½ hours, it was stirred at 45–50° C. for 23 hours. A small amount of undissolved solid still remained. This, after it was filtered off and dried, weighed 4.5 g. The clear, light yellow filtrate was diluted to 2 liters and precipitated, first with dilute hydrochloric acid (1 volume of concentrated hydrochloric acid to 30 volumes of water) and then by making it acid to Congo red with 10% hydrochloric acid. The bulky, white, gelatinous precipitate of N-(2-acetylamino-3,5-diiodobenzoyl)-glutamic acid did not coagulate appreciably when the mixture was stirred for three hours at 70–80° C. The precipitate was filtered off, washed, and dried in a vacuum desiccator over sulfuric acid for several days. It was then ground in a mortar and dried to constant weight at 100° C. The dry product weighed 62.7 g. (90% of theory) and melted at 194.7–196.4° C. with decomposition when it was placed in the melting point apparatus at room temperature. The neutralization equivalent was 560 (theory=556). The solubility of the sodium salt prepared from this material was found to be 75.9 g. in 100 g. of water at 27.5° C.

EXAMPLE 7

N-(2-acetylamino-3,5-diiodobenzoyl)-α-aminophenylacetic acid

α-Aminophenylacetic acid (7.6 g.) was stirred with anhydro-2-acetylamino-3,5-diiodobenzoic acid (10.3 g., 0.025 mole) in water (20 ml.), dioxane (20 ml.) and sodium hydroxide (4 ml. of 35° Bé. solution; equivalent to 1.5 g. NaOH). The temperature rose to 37° C. As very little of the solid dissolved, the mixture was warmed to 45–50° C. for two hours. After it stood overnight, it was stirred again for an additional three hours and then left to stand for several days. Even then some of the solid was undissolved. This was filtered off after the mixture was diluted with 150 ml. of water.

The filtrate was warmed to 60° C., stirred, and precipitated with dilute hydrochloric acid (1 volume of concentrated hydrochloric acid to 30 volumes of water). The very fluffy gelatinous precipitate was filtered off, washed, and dried to constant weight in a vacuum desiccator. It weighed 11.2 g. (79.5% of theory) and melted to a red liquid at 206–207° C. with evolution of a gas. This material was twice recrystallized from alcohol, each time filtering off a small insoluble residue. The purified N-(2-acetyl-amino-3,5-diiodobenzoyl)-α-aminophenylacetic acid was a fluffy white solid melting at 253.7° C. with decomposition. Found on analysis: 35.92% and 36.06% carbon; 2.50% and 2.54% hydrogen. Calculated for $C_{17}H_{14}O_4N_2I_2$: 36.17% carbon; 2.50% hydrogen.

EXAMPLE 8

N-(2-benzoylamino-3,5-diiodobenzoyl)-aminoacetic acid

Anhydro-2-benzoylamino-3,5-diiodobenzoic acid (8.3 g., 0.0175 mole) was stirred with aminoacetic acid (2.6 g., 0.035 mole) in water (14 ml.), dioxane (14 ml.) and sodium hydroxide (2.8 ml. of 35° Bé. solution). The temperature rose initially to 36° C. and then dropepd to 34° C. (room temperature). After two hours the temperature was raised to 45° C. and stirring was continued for a total of 28 hours. During this time, more dioxane (9 ml.) and water (3 ml.) were added to replace that lost by evaporation. The reaction mixture remained alkaline to phenolphthalein. When the mixture was diluted with 150 ml. of water, a yellow solid settled to the bottom of the mixture. This was some of the anhydro starting material. A lighter, white solid could be kept in suspension by gentle stirring, and it was separated from the yellow solid by decantation. The white solid was dissolved by adding water (100 ml.) and sodium hydroxide (0.1 ml. of 35° Bé. solution) and warming the mixture to 60° C. A small amount of yellow residue was filtered off. The filtrate was cooled first at room temperature and then in a refrigerator for a day or so. The resulting white crystals of the sodium salt were filtered off and dissolved in one liter of water. An opalescence which persisted even after the solution was made slightly alkaline to litmus was removed almost completely by filtration through a fine sintered glass funnel. The acid was reprecipitated by making the solution acid to Congo red with 10% hydrochloric acid at 50–60° C. The voluminous, gelatinous, translucent solid that was formed initially became white and compact upon further heating. The precipitate was filtered off, washed, and dried at 100° C. It weighed 5.2 g. (54% of theory) and melted to a dark liquid at 260–261.5° C. The product was neither 2-benzoylamino-3,5-diiodobenzoic acid, nor aminoacetic acid as shown by mixed melting points but was N-(2-benzoylamino-3,5-diiodobenzoyl)-aminoacetic acid, which was recrystallized twice from 75% (by volume) ethyl alcohol. Found on analysis: 36.12% and 36.19% carbon; 2.55% and 2.45% hydrogen. Calculated for $C_{16}H_{12}O_4N_2I_2$: 34.91% carbon; 2.20% hydrogen. All of the evidence indicated it to be a slightly impure form of the desired compound.

It will be apparent from the foregoing that many variations are possible within the broad scope of my invention. Other exemplary amino acids, the acylamino-benzoyl derivatives of which are useful, are aspartic acid, hydroxyglutamic acid, alanine, valine, leucine, norleucine, isoleucine, phenylalanine, serine, threonine, tyrosine and diiodotyrosine. Amino acids, other than α-amino acids may also be used provided that the carbon atom to which the amino group is attached is not a part of an unsaturated, cyclic nucleus, and other substituents which are present are substantially unreactive towards the anhydro-acylamino benzoic acid. As examples of reactive groups other than amino groups may be mentioned amido and sulfhydryl groups. Likewise, the anhydro derivatives of many other 2-acylamino-3,5-diiodobenzoic acids are useful in practicing this invention. By way of example may be mentioned: n-caproylamino-3,5-diiodobenzoic acid, 2-butyrylamino-3,5-diiodobenzoic acid, 2-α-phenylbutyrylamino-3,5-diiodobenzoic acid, and 2-o-iodobenzoylamino-3,5-diiodobenzoic acid.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

I claim:
1. A compound selected from the group consisting of compounds having the formula:

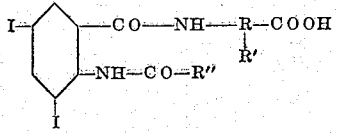

where R is selected from the group consisting of methylene and lower polymethylene radicals, R' is selected from the group consisting of phenyl, carboxy lower alkyl and hydroxy lower alkyl radicals, and hydrogen, and R" is selected from the group consisting of alkyl and phenyl radicals, and the non-toxic salts thereof.

2. 2-acetylamino-3,5-diiodohippuric acid.
3. N - (2-acetylamino - 3,5 - diiodobenzoyl) -ω- aminocaproic acid.
4. N - (2-acetylamino - 3,5 - diiodobenzoyl) - glutamic acid.
5. N-(2-acetylamino - 3,5 - diiodobenzoyl) -α- aminophenylacetic acid.
6. N-(2-benzoylamino - 3,5 - diiodobenzoyl) - aminoacetic acid.
7. The method of forming acylamino benzoyl amino acids which comprises reacting anhydro derivatives of 2-acylamino benzoic acids with an amino acid.
8. The method of forming iodinated acylamino benzoyl amino acids which comprises reacting anhydro iodinated derivatives of 2-acylamino benzoic acids with an amino acid.

9. The method of forming compounds having the following structure:

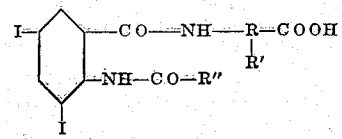

where R is selected from the group consisting of methylene and lower polymethylene radicals, R' is selected from the group consisting of phenyl, carboxy lower alkyl and hydroxy lower alkyl radicals, and hydrogen, and R" is selected from the group consisting of alkyl and phenyl radicals, which comprises reacting 2-acylamino-3,5-diiodobenzoic acid with an amino acid.

VERNON H. WALLINGFORD.

REFERENCES CITED

The following references are of record in the file of this patent:

UNITED STATES PATENTS

| Number | Name | Date |
| --- | --- | --- |
| 2,135,474 | Sachs | Nov. 1, 1938 |
| 2,160,413 | Dohrn et al. | May 30, 1939 |

OTHER REFERENCES

Smith et al., Chem. Abs., vol. 39, col. 3821–3822 (1945).

Goldberg et al., Chem. Abs., vol. 41, col. 4131 (1947).